Figure 1:
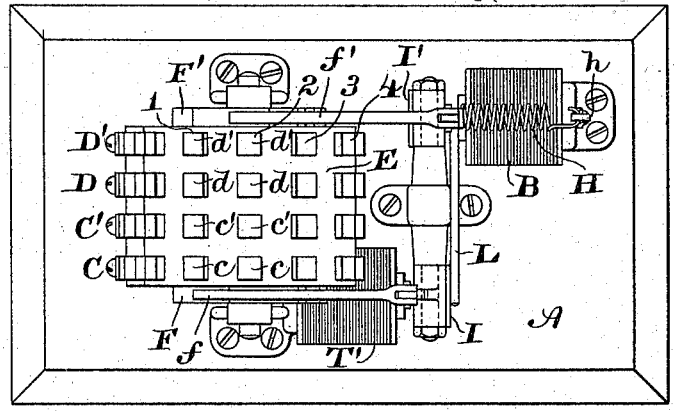

(No Model.)

E. A. SPERRY.
ELECTRIC BRAKE.

No. 571,409. Patented Nov. 17, 1896.

WITNESSES:
A. H. Abell.
A. F. Macdonald.

INVENTOR:
Elmer A. Sperry, by
Geo. R. Blodgett,
Atty.

UNITED STATES PATENT OFFICE.

ELMER A. SPERRY, OF CLEVELAND, OHIO, ASSIGNOR TO THE GENERAL ELECTRIC COMPANY, OF NEW YORK.

ELECTRIC BRAKE.

SPECIFICATION forming part of Letters Patent No. 571,409, dated November 17, 1896.

Application filed June 20, 1896. Serial No. 596,253. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Electric Brakes, (Case No. 395,) of which the following is a specification.

My invention relates to electric brakes, and has for its object to provide an electrical means of holding a car upon a grade after the brake has been operated and the braking-current from the motors acting as generators has ceased or practically ceased.

In the operation of electric brakes the motors when operating as generators always furnish an excess of energy beyond that required to operate the brake-magnets. This must be dissipated in resistances. It has also been found that where a stop is made upon a very steep grade (or one of less pitch where the stop is a long one) the current ceases in the brake-circuit, and after the remanent magnetism dies out in the brake-shoe the car will start. It has been proposed to remedy this by inclosing in the brake-shoe small coils in the trolley-circuit, so arranged that in the last position of the braking-controller the motors will be cut out and the holding or locking coil in the trolley-circuit will be brought into action. This, however, is objectionable, inasmuch as it takes not only a special construction of brake-shoe involving a high-resistance coil (more or less expensive) in addition to the ordinary coil, but also takes some energy from the power-house and represents current cost, which it is desirable to cut down by every possible means. The apparatus which I have devised obviates these two objections to the trolley-operated magnetic lock by dispensing with the additional coils and utilizing a portion of the surplus energy furnished from the motors when operating the brake-shoes. It consists, briefly, of a small storage battery or source of electromotive force and a special switching arrangement or commutator, by means of which the battery is included in circuit with the braking-generators while they are furnishing surplus energy. As soon, however, as the braking-current falls off the switching device or commutator is automatically operated by electromagnets, so that the battery will be coupled to discharge through the braking-circuit. As the current in this circuit is in the same direction at all times when operating the brakes the same coils can be used in the brake-shoes, no special construction being required, and the entire energy being furnished by the momentum-actuated motors with no additional cost for current.

Figure 2:
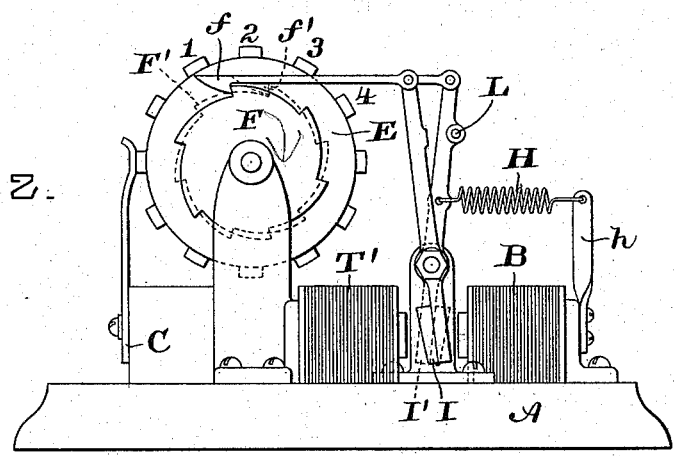
Figure 3:
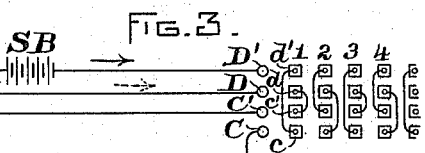

The accompanying drawings show an embodiment of my invention, Figure 1 being a plan view of the commutator or switch for carrying out its objects; Fig. 2, a side elevation of the parts shown in Fig. 1. Fig. 3 is a diagram of the braking-circuits, and Fig. 4 a diagram of the circuits in the car, showing the trolley and the controller.

In Fig. 1, A is the base of the apparatus. B is an electromagnet-coil included in the braking-circuit. C C' D D' are contacts or brushes coöperating with contacts $c$ $c'$ $d$ $d'$ upon the commutating or switching cylinder. These contacts are arranged in alternate rows 1 2 3 4, &c., and are cross-connected, as shown in Fig. 3, so that the direction of current is reversed as the commutating-cylinder is revolved. E is the commutating-cylinder, provided with two ratchet-wheels F F' upon opposite sides. These are represented as having six teeth, and as there are twelve series of contacts $c$ $c'$, &c., the ratchets are half a step separated, one being in advance of the other, so that the pawls $f$ $f'$, corresponding, respectively, to the two ratchets when reciprocated, cause the commutating-cylinder to advance at each step by one-twelfth of a revolution. T' is an electromagnet-coil in the trolley-circuit. It may be located in any one of the leads from the controller which conveys the trolley-current or in the lead from the trolley to the controller. A spring H is provided, connecting with the pawl $f'$, its other end being secured to the post $h$. Upon the opposite end of the levers connected to the two pawls are armatures I I', operated, respectively, by the electromagnets B T'. The pawl $f'$ has no spring, remaining wherever it is placed.

In Fig. 3 the storage battery SB is shown as having its terminals connected to the contacts D D', while the braking-circuit, including the electromagnet B, the motors M M', and the brake-shoe BS, has its terminals connected to the contacts C C'. When these contacts are upon the corresponding contacts $c$ $c'$ $d$ $d'$ of the first row, 1, of the commutating-cylinder, the storage battery is being charged, and the current flows in the direction of the arrows; but when the row of contacts 2 is brought into play the terminals of the battery are reversed relatively to the brake-circuit, so that it discharges in the direction of the arrow shown in dotted lines. The direction of current, however, in the brake-circuit is the same in both cases.

Figure 4:
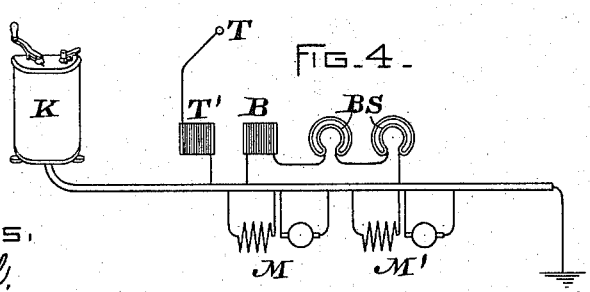

In Fig. 4 the connection of the electromagnets T' B into the circuit is shown, K being the controller, T being the trolley, the other parts being as shown before, and the circuit being complete through the ground at G when taking trolley-current. The different sets of contacts upon the commutating device act simply to change the direction of current in the storage-battery circuit. It is of course to be understood that a suitable braking-controller is provided, many forms of which are now well known in the art, the device being operative with any of them.

The operation of the apparatus illustrated and described is as follows: Assuming the car to be running and current supplied from the trolley, the armature I would be attracted by the electromagnet T' in the trolley-circuit, rotating the cylinder one-twelfth and bringing into play one of the sets of contacts, say, the row numbered "1," connecting the battery-terminals in position for receiving charge from the brake-circuit whenever there is current in that circuit. Suppose the controller-handle to be now thrown to its off position. The current in the electromagnet T' ceases, but there being no retracting-spring upon the armature I it remains in the same position. If the motorman should now again throw on the trolley-current before applying the brake, no change in the circuit relations of the battery would be made. Suppose, however, that the brake is applied. In this case the armature I' is attracted by the electromagnet B, and both of the ratchets move forward, the pawl $f'$ engaging with one of the teeth of the ratchet-wheel F', the rod L, which is secured to the lever of the armature I', striking against the lever of the armature I, which carries the the pawl $f$, and forcing that pawl forward in unison with the pawl $f'$. So long as the brake-current flows the armatures are held in this position until the car is brought to rest. When the electromotive force of the battery overcomes the electromotive force in the brake-circuit, so that there is no energy in the electromagnet B, the spring H retracts the pawl $f'$ and throws the commutating-switch one-twelfth of a revolution; but as this occurs at the time when substantially no current is flowing there is no sparking at the switch-contacts. After the contacts are shifted, however, the storage battery discharges into the brake-circuit, aiding the remanent magnetism of the brake-shoes to hold the car in place. If the brake be applied several times in succession (as in going down a long hill) without utilizing the trolley-current, the apparatus will not be thrown out of step, because the stroke of the pawls is less than the distance between the ratchet-teeth, and because of the absence of a retracting-spring upon the pawl $f$.

What I claim as new, and desire to secure by Letters Patent of the United States, is—

1. In an electric braking apparatus comprising motors operating as generators to supply a braking-current and electromagnetic-braking devices, an auxiliary source of electromotive force independent of the motors and the trolley-current, and a device for causing the current from the auxiliary source to pass through the brake-magnets when the braking-current ceases.

2. In a brake-circuit containing a dynamo-electric machine, the combination of a storage battery with a device adapted to connect the battery in the brake-circuit in one direction for charging and in the other direction for discharging.

3. In an electric braking apparatus, a storage battery, and an automatic switch adapted to connect it in the brake-circuit in one direction while the motors are acting as generators, and in the other direction to discharge through the brake-circuit when the current from the motors ceases.

4. In an electric braking apparatus, a switching mechanism, oppositely-acting coils in the brake and trolley circuit, and mechanical connections between the switch and the coils.

5. An automatic switching device for a braking-circuit, comprising a cylinder with cross-connected contacts in alternately-reversed positions, fixed contacts for the braking-circuit and for the auxiliary source of electromotive force, a coil in the trolley-circuit, a coil in the braking-circuit, and means operated by the coils for rotating the cylinder.

6. A switching mechanism for use with electric braking apparatus, comprising cross-connected movable contacts, fixed contacts, coils in the brake and trolley circuit, and armatures coöperating with the coils and making mechanical connection with the movable contacts, one of the armatures working against a spring and the other having no spring.

In witness whereof I have hereunto set my hand this 18th day of June, 1896.

ELMER A. SPERRY.

Witnesses:
C. G. SMEDBERG,
L. LEWIS.